US006793853B2

(12) United States Patent
Carroll

(10) Patent No.: US 6,793,853 B2
(45) Date of Patent: Sep. 21, 2004

(54) METHOD OF MAKING SLOTTED TUBULAR DUNNAGE

(75) Inventor: Hazen J. Carroll, Marine City, MI (US)

(73) Assignee: Carroll Packaging, Dearborn, MI (US)

( * ) Notice: Subject to any disclaimer, the term of this patent is extended or adjusted under 35 U.S.C. 154(b) by 250 days.

(21) Appl. No.: 09/940,105

(22) Filed: Aug. 27, 2001

(65) Prior Publication Data

US 2003/0038389 A1 Feb. 27, 2003

(51) Int. Cl.[7] .............................. B26F 1/02; B26F 1/38; B29C 67/00; B29C 69/00

(52) U.S. Cl. ....................... 264/40.1; 264/154; 264/156

(58) Field of Search ................................ 264/40.1, 154, 264/156

(56) References Cited

U.S. PATENT DOCUMENTS 5,178,279 A 1/1993 Carroll
5,267,652 A 12/1993 Carroll
5,306,455 A 4/1994 Carroll

*Primary Examiner*—Leo B. Tentoni
(74) *Attorney, Agent, or Firm*—Brooks Kushman P.C.

(57) ABSTRACT

The present invention involves a method of making slotted tubular dunnage. The method of the present invention includes providing a tube having a pair of flanges at opposite sides extending along the length of the tube, and holding the tube by gripping the flanges at opposite sides of the tube and squeezing sides of the tube together. The method further includes moving the tube into a slotting position between a steel rule die and a kissing plate while holding the tube with the sides squeezed together. The method further includes shifting the die against and through the sides of the tube forming a slot therein surrounding a cutout slug of the tube. The method further includes withdrawing the die from the tube while retaining the slug within the slot. Furthermore, the method includes moving the tube to a discharged position and discontinuing the squeezing of the tube.

11 Claims, 7 Drawing Sheets

METHOD OF MAKING SLOTTED TUBULAR DUNNAGE

BACKGROUND OF THE INVENTION

1. Field of the Invention

The present invention is related to an apparatus and a method of making slotted tubular dunnage for supporting products in a shipping container.

2. Background Art

Typically, a shipping or storage carton in which dunnage may be placed for supporting parts comprises a conventional cardboard or similar box having four connected sidewalls, a connected bottom wall, and four hinged lid flaps. The box is sized to accept the length of particular products being shipped or stored. Specifically, within the box is disposed laterally spaced apart lengths of tubular dunnage, wherein the lengths of the dunnage are such as to slidably fit between walls of the box. The dunnage may be laterally arranged in pairs which cooperatively support a plurality of products being shipped or stored.

It is known that the auto industry in the United States has been moving toward the elimination of foam packaging such as polystyrene and other foams for automotive parts. This includes a substantial elimination of dunnage used in the automotive industry for handling and shipping automotive parts. Generally, such parts have been shipped in boxes having a bottom wall, side walls, and a lid wherein dunnage is placed to support the parts against abrasion and damage during shipment.

As provided in U.S. Pat. No. 5,267,652 to Carroll which is herein incorporated by reference, dunnage is made by a method of placing a tube into a clamp shell fixture having upper and lower platens movable between open and closed positions. As the tube is inserted therein, the clam shell fixture is closed and engages the sides of the tube with the platens to form slots on the tube, forming the dunnage.

Although the current methods are adequate, the industry continues to look to more time and cost effective ways.

SUMMARY OF THE INVENTION

Thus, it is an object of the present invention to provide an improved apparatus and method of making slotted tubular dunnage for supporting products in a shipping container. The present invention provides a more efficient way of making slotted tubular dunnage. The present invention is more efficient because it saves time and costs in making such dunnage.

It is another object of the present invention to provide an improved method of making slotted tubular dunnage for supporting products. The method comprises providing a tube having a pair of flanges at opposite sides extending along the length of the tube, and holding the tube by gripping the flanges at opposite sides of the tube and squeezing the sides of the tube together. The method further includes, while holding the tube with the sides squeezed together, moving the tube into a slotting position between a steel rule die and a kissing plate and in such position shifting the steel rule die against and through the sides of the tube, forming a slot therein surrounding a cut-out slug of the tube. The method further comprises withdrawing the steel rule die from the tube while retaining the slug within the slot, and while squeezing the tube, moving the tube to a discharge position where at the squeezing the sides of the tube is discontinued.

It is yet another object of the present invention to provide an improved apparatus for stamping a tube to make a slotted tubular dunnage for supporting products in a shipping container. The apparatus comprises a fixture for holding a steel rule die with a face for stamping the tube to make the slotted tubular dunnage, and a movable base plate having clamps with notches formed thereon to hold the tube on the movable base plate, wherein the movable base plate is movable along a substantially parallel plane relative to the face of the die. The apparatus further comprises a conveying mechanism for moving the movable base plate to and from the steel rule die along the substantially parallel plane relative to the face of the die, wherein the conveying mechanism is connected to the movable base plate. The apparatus further includes a sensor for determining the presence of the tube held on the movable base plate in an indexing position, wherein the sensor is in communication with the movable base plate, and a microprocessor for controlling the fixture to cut an opening on the tube after the presence of the tube on the movable base plate is determined, wherein the microprocessor is in communication with the sensor, the fixture, and the conveying mechanism.

It is still another object of the present invention to provide an improved method of making slotted tubular dunnage for supporting products in a shipping container. The method comprises providing a tube including a pair of opposed side walls integrally connected to each other, wherein each side wall has a terminal edge. The terminal edges are bridged together by a bottom wall, wherein the bottom wall has ends. Each end extends past one edge to define lateral flanges. The method further comprises providing a steel rule stamping apparatus having a plurality of steel rule stamping dies horizontally aligned, wherein each die has a face for stamping the tube to make the slotted tubular dunnage. The apparatus has a movable base plate in a home position, wherein the movable base plate has clamps attached thereto. Each of the clamps has notches formed thereon to receive one of the flanges. The movable base plate is movable along a substantially parallel plane relative to the face of each die. The method further includes sliding each of the flanges within one of the notches to position the tube on the movable base plate in the home position, and clamping the tube to substantially evenly hold the tube on the base plate in the home position, allowing the tube to be movable with the movable base plate. The method further includes moving the tube toward the die from the home position to an indexing position at which the tube is to be sensed, sensing the tube clamped on the base plate in the indexing position, moving the tube a first predetermined distance toward the die along the substantially parallel plane relative to the face of the die, and flattening the tube by engaging the opposed side walls. The method further includes cutting a first set of openings on the tube along the first predetermined distance to form a first set of horizontally aligned slots on the tube and respective cut-out slugs of the slots, defining the slotted tubular dunnage.

DETAILED DESCRIPTION OF THE PREFERRED EMBODIMENTS

Figure 1:
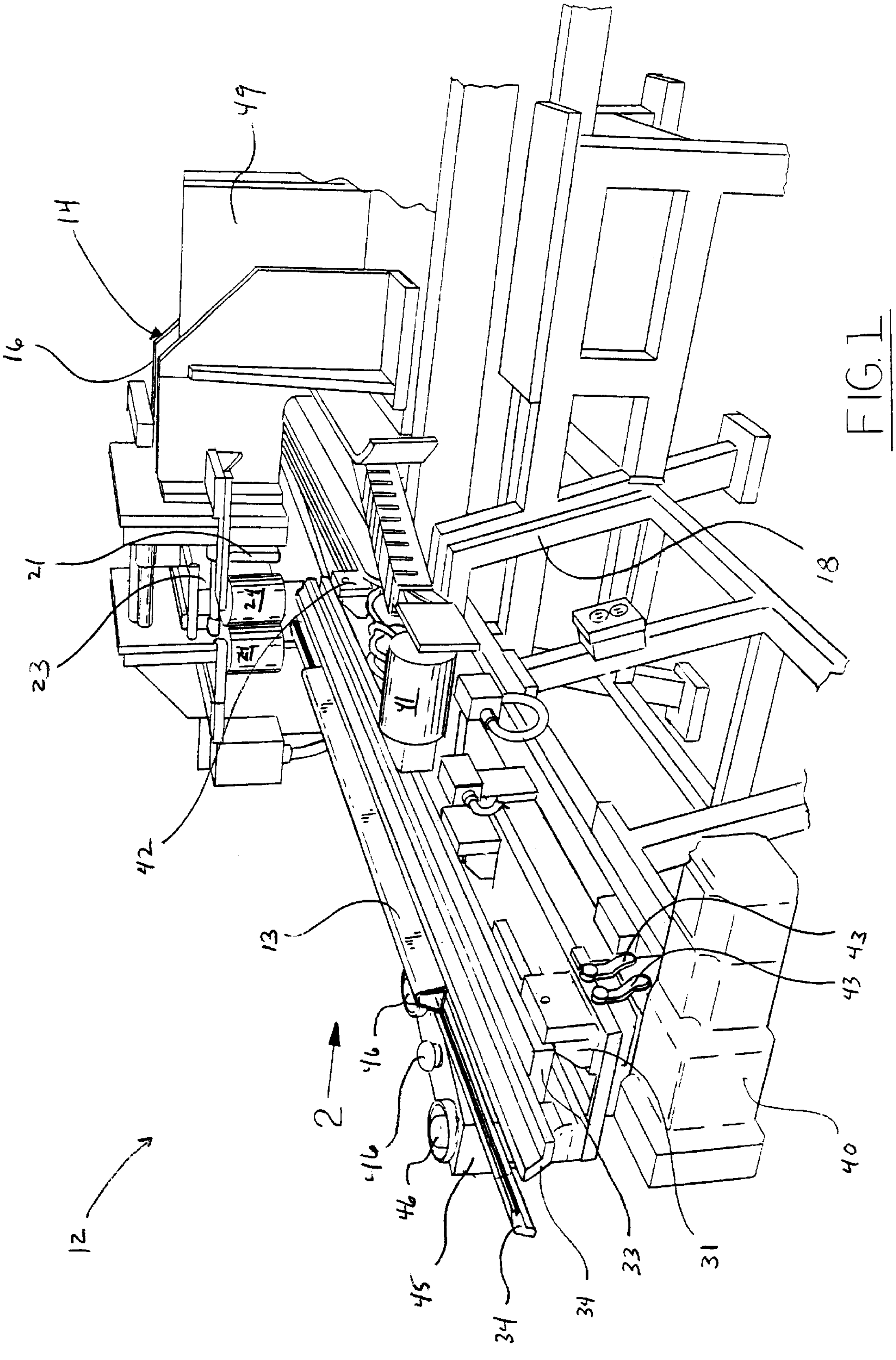
FIG. 1 is a perspective view of an apparatus for stamping a tube to make slotted tubular dunnage for supporting products in a shipping container.
Figure 2:
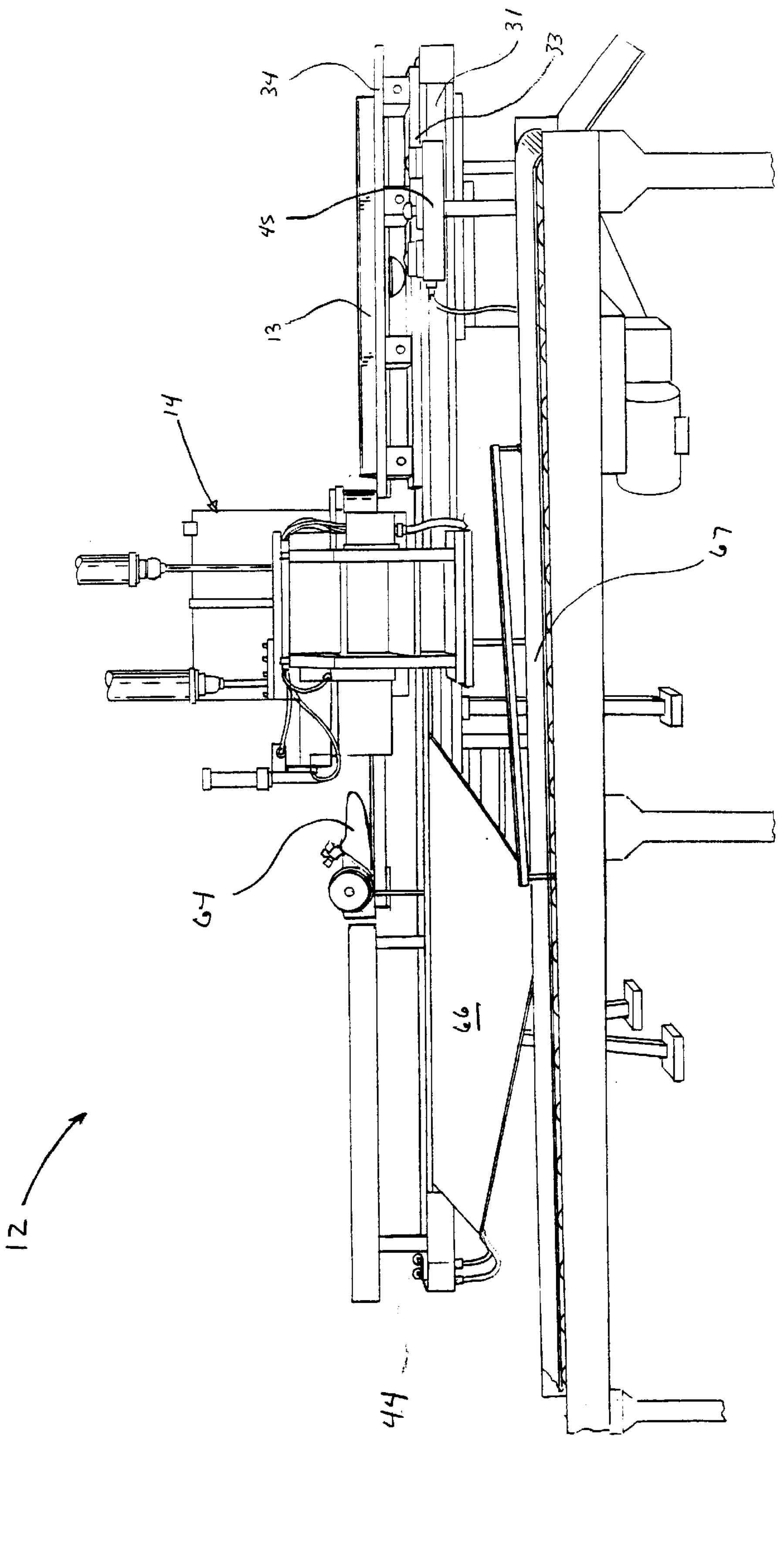
FIG. 2 is a side view of the apparatus of FIG. 1 in accordance with the present invention.
Figure 3:
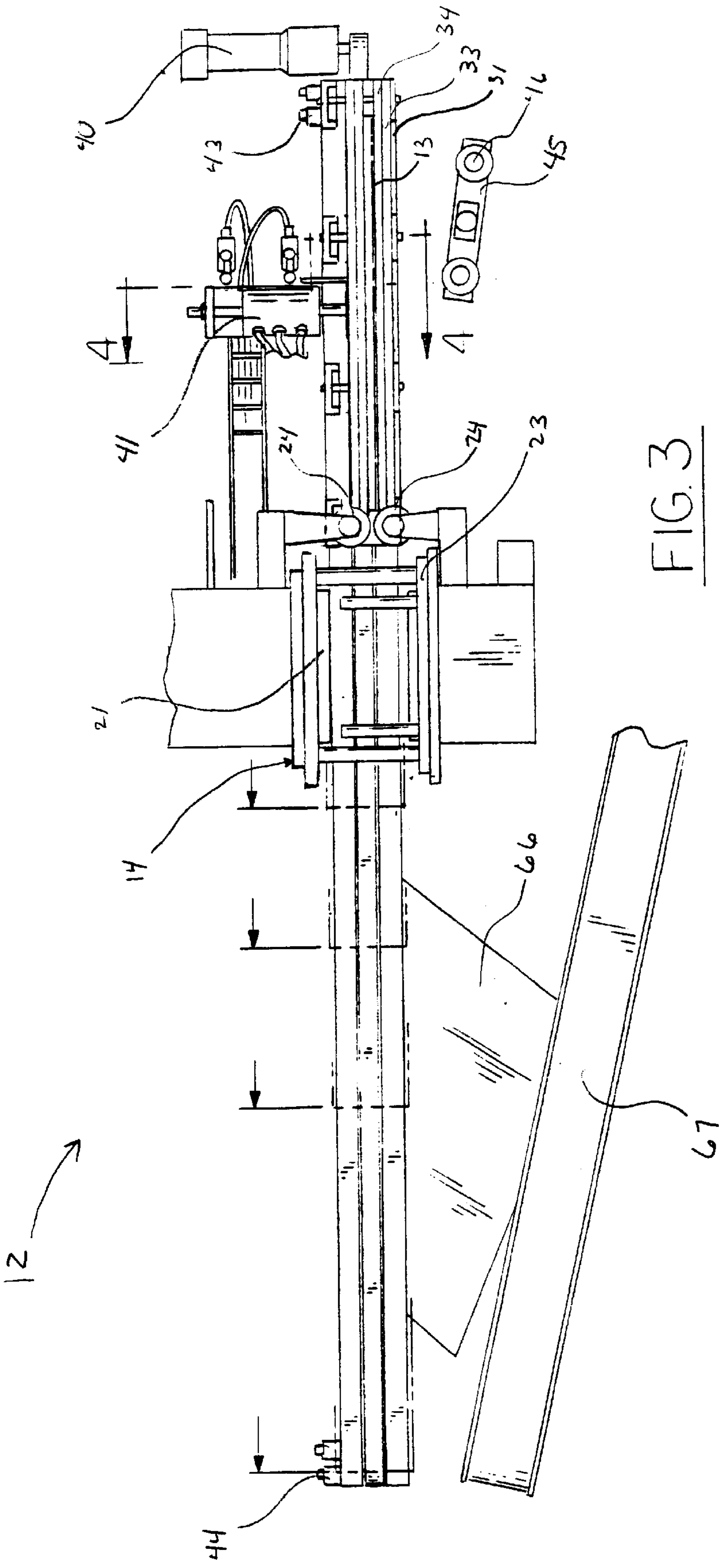
FIG. 3 is a top view of the apparatus of FIG. 1.

FIG. 1 illustrates an apparatus 12 for stamping a tube 13 to make slotted tubular dunnage for supporting products in a shipping container (not shown). As shown, fixture 14 is configured to hold and support a number of members of apparatus 12 such that slotted tubular dunnage may be made from stamping tube 13. As shown in FIGS. 1 and 2, fixture 14 includes a body portion 16 which holds and supports steel rule die 21 and backing or kissing plate 23 disposed on body portion 16. Steel rule die 21 and backing plate 23 are attached to body portion 16 in a manner such that die 21 and plate 23 face each other to allow die 21 to shift toward plate 23 and contact plate 23. Steel rule die 21 has face or blade 22 (shown in FIG. 9) which is configured to a desired shape in accordance to a desired configuration of the slotted tubular dunnage to be made. Backing or kissing plate 23 oppositely faces blade 22 such that blade 22 contacts or "kisses" backing plate 23 during operation of apparatus 12. As described in greater detail below, when tube 13 is placed between die 21 and backing plate 23, blade 22 of die 21 shifts against and through tube 13 and contacts backing plate 23, thereby forming the slotted tubular dunnage. As shown in FIGS. 1 and 3, body portion 16 of fixture 14 further includes rollers 24 which, in operation, receive and flatten tube 13 to be stamped to make the slotted tubular dunnage.

Figure 4:
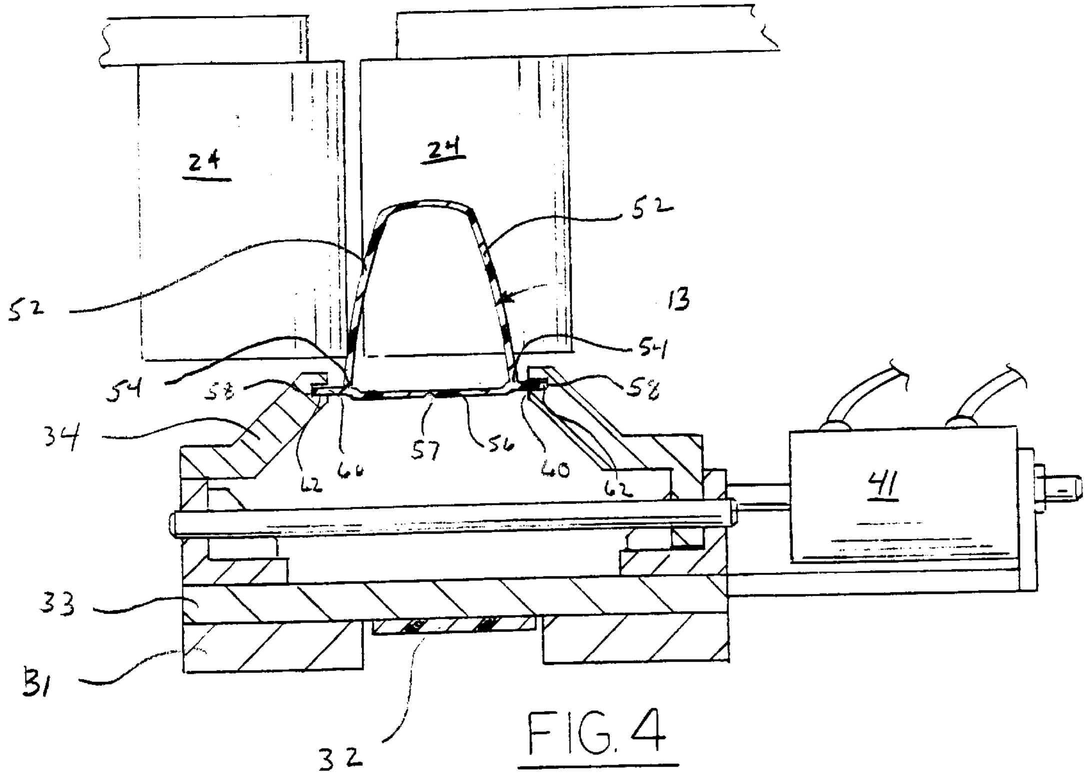
FIG. 4 is a cross-sectional view of the apparatus having clamps in an open position shown in FIG. 3 taken along lines 4—4.
Figure 5:
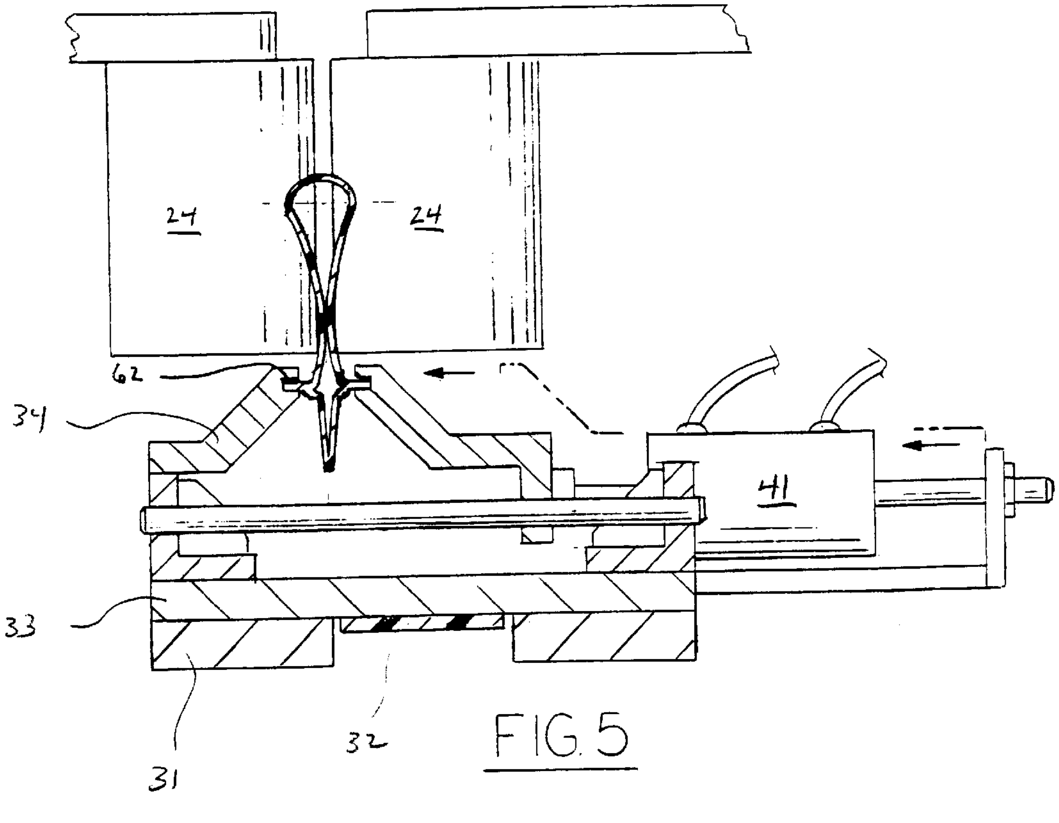
FIG. 5 is a cross-sectional view of the apparatus having clamps in a closed position shown in FIG. 3 taken along lines 5—5.
Figure 6:
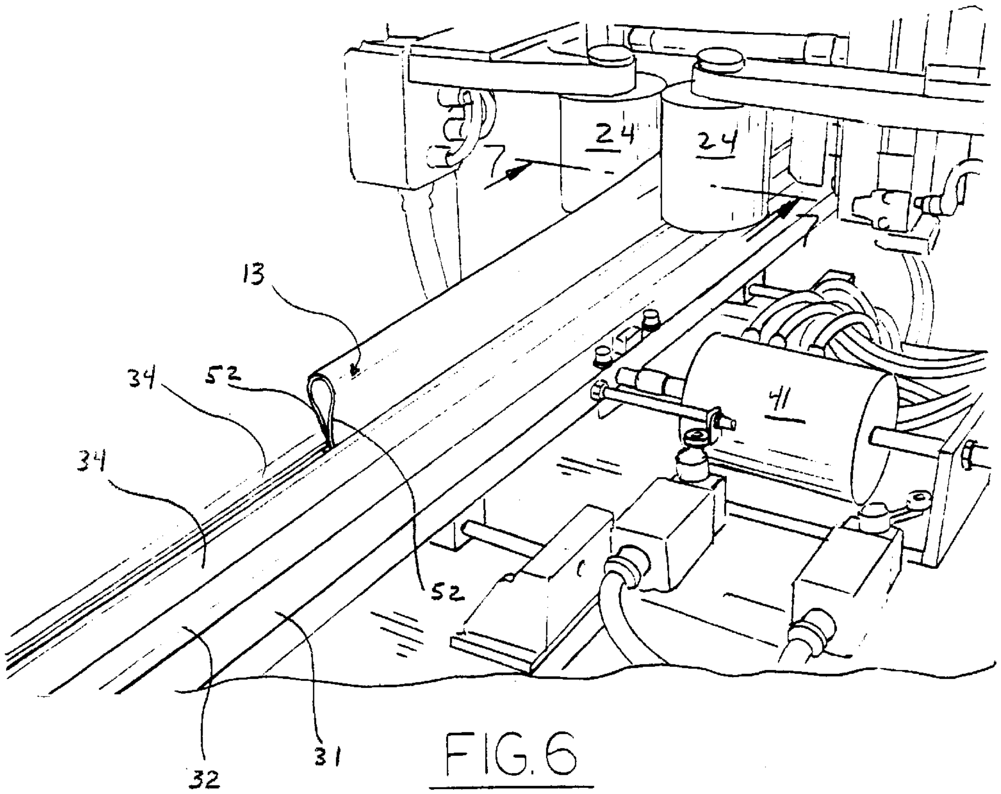
FIG. 6 is a perspective view of the apparatus capable of moving a tube into a slotting position in accordance with the present invention.
Figure 7:
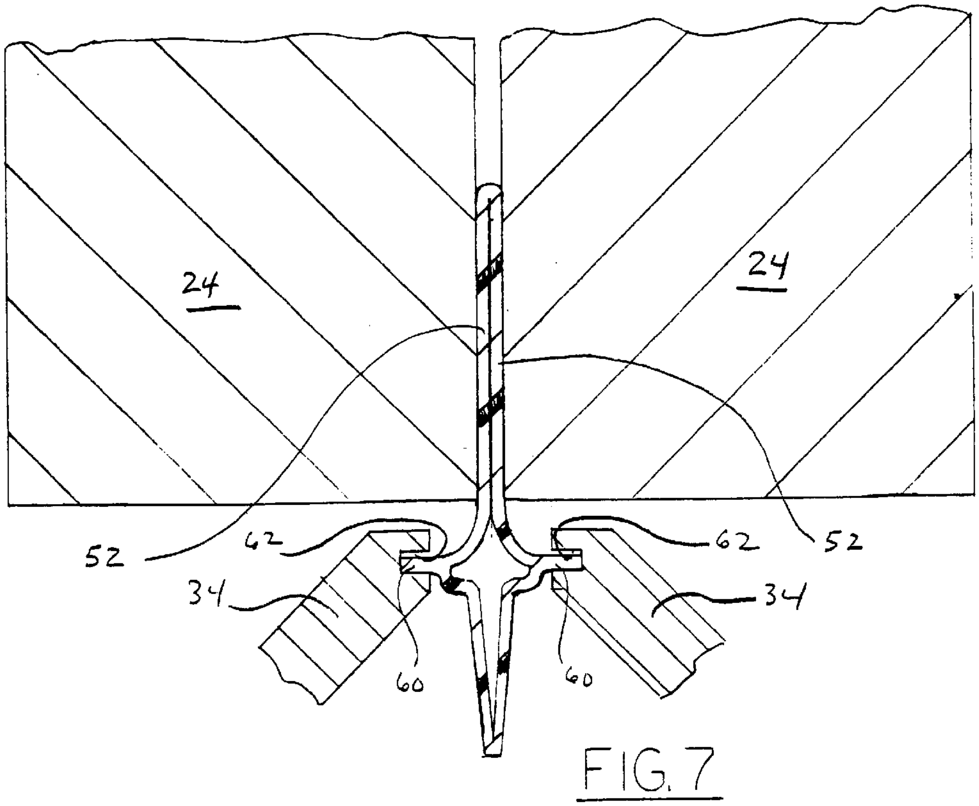
FIG. 7 is a cross-sectional view of the apparatus partially shown in FIG. 6 taken along lines 7—7.

As shown in FIGS. 1–3, lower portion 18 holds and supports track 31 which is disposed along a substantially parallel plane relative to the face 22 of steel rule die 21, and is disposed between die 21 and plate 23. As shown, movable belt 32 is disposed along track 31 and moves along the substantially parallel plane relative to the face 22 of die 21. Movable base plate 33 is disposed on track 31 and along an area of movable belt 32. Thus, movable base plate 33 moves along a distance which the area of movable belt 32 moves. As shown in FIGS. 4 and 5, movable base plate 33 further includes clamps 34 disposed thereon. Clamps 34 are configured to have an open position (FIG. 4) and a closed position (FIG. 5). Each of clamps 34 has notch 62 formed thereon. In the open position (FIG. 4), tube 13 may be disposed between clamps 34 by sliding tube 13 through notches 62. Then, clamps 34 are placed together in the closed position engaging sides 52 of tube 13 together, thereby securing tube 13 onto base plate 33. It is to be noted that clamps 34 may both be configured to move together to engage sides 52 together. However, as shown in FIG. 5, in this embodiment, one of clamps 34 moves as the other remains stationary. Clamps 34 are movable with movable base plate 33.

As shown in FIG. 1, an electronic eye 42 is attached to track 31 and adjacent rollers 24. Electronic eye 42 may be any suitable electronic dye capable of sensing tube 13 as tube 13 is moved along track 31. As shown in FIGS. 1–3, apparatus 12 further includes motor 40 disposed on lower portion 18. Motor 40 provides power to movable belt 32 and movable base plate 33 to move base plate 33 along the substantially parallel plane relative to the face 22 of each die 21. Motor 40 may be any motor known in the art suitable to move base plate 33 along the substantially parallel plane relative to the face 22 of each die 21, such as a servo motor.

As shown in FIGS. 1, 3, 6, and 10, steel rule die 21 is shifted against and through tube 13, thereby contacting backing plate 23. In this embodiment, steel rule die 21 is moved hydraulically by air cylinder 41 which is disposed on lower portion 18 and provides compressed air configured in any known fashion to move steel rule die 21 against and through tube 13, thereby contacting backing plate 23. Additionally, in this embodiment, air cylinder 41 provides compressed air in any known fashion to one of the clamps 34 to move the clamps 34 in the open and closed positions.

Apparatus 12 further includes control panel 45 and program panel 49. Control panel 45 includes control switches 46 which, when activated, allows movement of belt 32 along track 31. Program panel 49 may include a microprocessor (not shown) which controls various parameters in operating apparatus 12. For example, a microprocessor in program panel 49 may be capable of controlling parameters, such as speed of belt 32, number of shifts of die 21, distance traveled between each shift, and distance of total travel, for example. Thus, for operation of apparatus 12, program panel 49 is in communication with control panel 45.

The operation of apparatus 12 includes of a method of making the slotted tubular dunnage for supporting products in a shipping container. The method comprises providing tube 13, shown in FIG. 4, which has a pair of flanges 60 at opposite sides 52, wherein flanges 60 extend along the length of tube 13. Tube 13 includes a pair of sides or side walls 52 which are integrally connected to each other. Each side wall 52 has a terminal edge 54, wherein the terminal edges 54 are bridged together by a bottom wall 56. The bottom wall 56 has ends 58, each of which extend past one edge 54 to define lateral flanges 60. Bottom wall 56 also includes a groove 57 formed along the length of tube 13. A user of apparatus 12 disposes or slides each of flanges 60 within one of notches 62 to position tube 13 on movable base plate 33 in a home position as shown in FIGS. 1 and 4. In this embodiment, the home position may be defined as a starting location for the tube 13 prior to making the slotted tubular dunnage. In this embodiment, apparatus 12 has a plurality of steel rule dies 21 which are horizontally aligned with each other, wherein each die has face 22 for stamping tube 13 to make the slotted tubular dunnage having sets of slots surrounding sets of cut-out slugs.

Then, the method includes holding the tube 13 by gripping or clamping flanges 60 with clamps 34 in the closed position (FIG. 5) at opposite sides 52 of the tube 13 and squeezing the sides 52 of the tube 13 together. Control panel 45 is configured to control such clamping and squeezing. In this embodiment, this is accomplished by depressing one of switches 46 on control panel 45. The tube 13 is clamped substantially evenly with clamps 34 to hold tube 13 on base plate 33 in the home position. This allows tube 13 to be movable with movable base plate 33. Then, tube 13 is moved toward steel rule dies 21 from the home position to an indexing position at which tube 13 is to be sensed by electronic eye 42. The indexing position of base plate 33 may be defined as a position at which tube 13 is sensed by electronic eye 42. Electronic eye 42 then senses the tube clamped on the base plate 33 in the indexing position.

Figure 8:
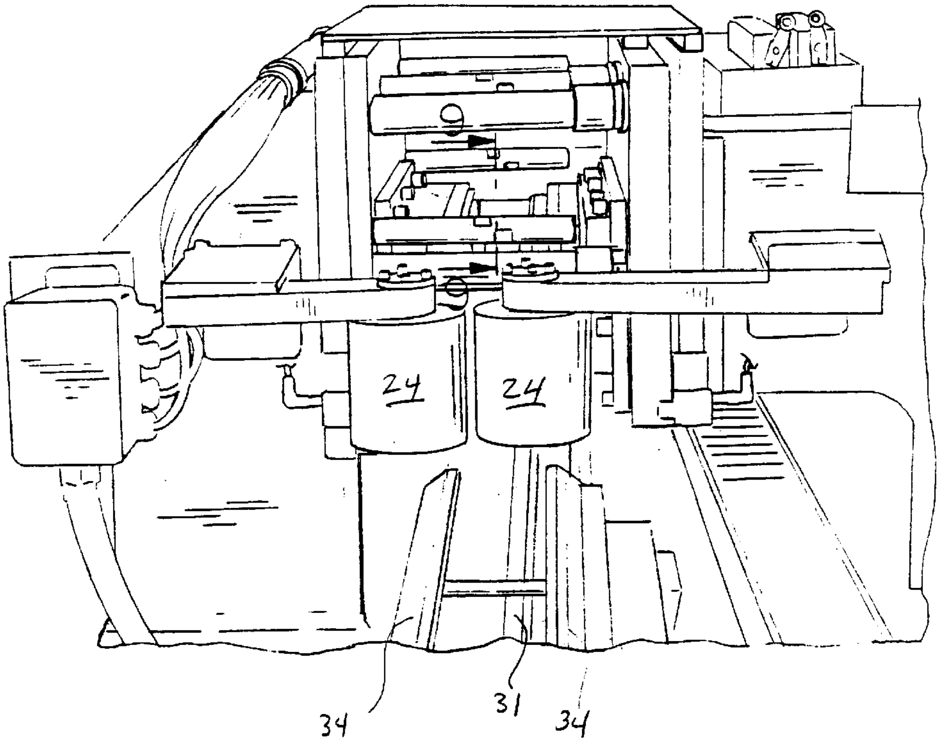
FIG. 8 is a front view of the apparatus of FIG. 1.
Figure 9:
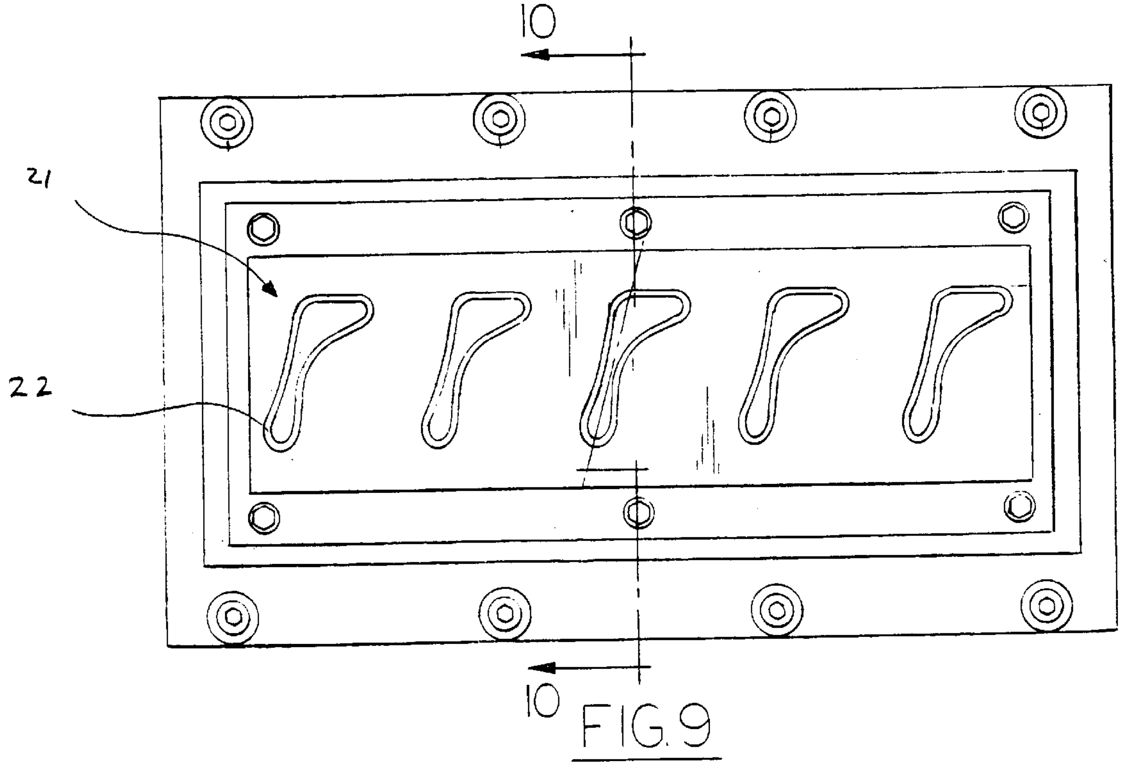
FIG. 9 is a cross-sectional view of the apparatus partially shown in FIG. 8 depicting a steel rule die taken along lines 9—9.
Figure 10:
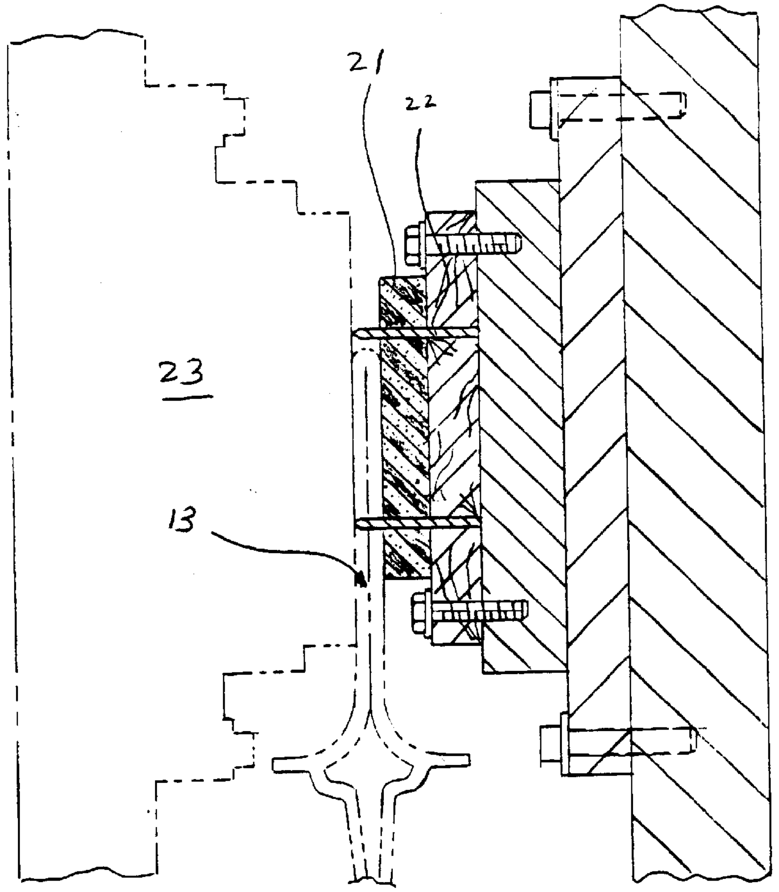
FIG. 10 is a cross-sectional view of the steel rule die of FIG. 9 taken along lines 10—10.

Then, tube 13 is moved toward the steel rule die 21 to a first slotting or cut position as described below. As shown in FIGS. 5–8, as tube 13 moves toward die 21, tube 13 is received between rollers 24 which flattens tube 13. Thus, the tube 13 is flattened by fully engaging the opposed side walls 52 during movement from the indexing position to the first cut position. While flattening and holding tube 13 with sides 52 squeezed together, tube 13 is moved into the first slotting or cut position which may be defined as a position of base plate 33 disposed between steel rule die 21 and backing plate 23. Thus, tube 13 is moved along a first predetermined distance from the indexing position toward die 21 along the substantially parallel plane relative to the face of each die. In the first slotting position, as shown in FIGS. 8–10, the steel rule die 21 is shifted against and through sides 52 of tube 13, forming a slot 36 therein which surrounds a cut-out slug or a set of cut-out slugs 38 of tube 13.

Then, steel rule die 21 is withdrawn from tube 13 while retaining slugs 38 within slots 36. While squeezing tube 13, tube 13 is moved a second predetermined distance from the first slotting position to a second slotting position which may be defined as another position of plate 33 disposed in the steel rule die 21 and the backing plate 23. In the second slotting position, the steel rule die 21 is again shifted against and through sides 52 of tube 13, forming a second slot or second set of slots 37 therein which surrounds a second cut-out slug or a second set of cut-out slugs 39 of tube 13. Then, steel rule die 21 is withdrawn from tube 13 while retaining sets of slugs 38, 39 within sets of slots 36, 37, respectively. While squeezing tube 13, tube 13 is moved to a discharge position where the squeezing of the sides 52 of tube 13 is discontinued.

Then, as tube 13 moves toward the discharge position, stopper 64 sufficiently contacts tube 13 to remove set of slugs 38, 39 from within set of slots 36, 37. In the discharge position, clamps 34 are moved into the open position to release resulting slotted tube 13' (FIG. 11) therefrom, allowing tube 13' to be gathered and retained. In this embodiment, sets of slugs 38, 39 have been sufficiently contacted by stopper 64 and are received by slide 66 and conveyor 67. In this embodiment, conveyor 67 is any suitable conveyor system which conveys both the slugs and the resulting slotted tubular dunnage 13' to be conveyed to the operator of apparatus 12.

Figure 11:
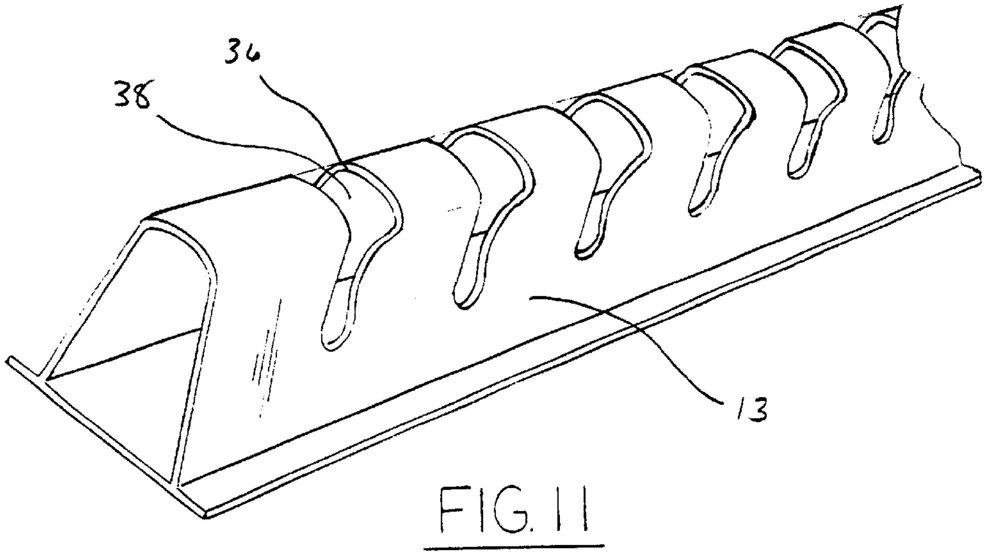
FIG. 11 is a perspective view of a slotted tubular dunnage made by the apparatus shown in FIGS. 1—10.

As shown in FIG. 11, each length of the tubular dunnage has been transversely slotted to provide product configured openings or slots 36. The slots 36 are adapted to receive the product in nesting relation. The slots also receive the product for cushioning purposes in a box (not shown). For this purpose, the slots 36 are designed to conform to the shape of the product so that when the product is inserted in the slots 36 the product is closely supported therein by the tube walls 52.

The tubes from which the dunnage is formed is preferably made by extrusion in a well-known fashion. It is made of a recyclable resilient plastic. The wall thickness should be such as to permit the tube to flex in use and during its manufacture, while still supporting the products out of contact with the other products in the box. The preferred but not necessary plastic for manufacture of the tubes is low density polyethylene (LDPE). This material may be chopped after use, remelted, and re-extruded with some additional virgin LDPE added, and then reformed for use as mentioned above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making slotted tubular dunnage for supporting products, the method comprising:

providing a tube having a pair of flanges at opposite sides extending along the length of the tube;

holding the tube by gripping the flanges at opposite sides of the tube and squeezing the sides of the tube together;

while holding the tube with the sides squeezed together, moving the tube into a slotting position between a steel rule die and a kissing plate and in such position shifting the steel rule die against and through the sides of the tube forming a slot therein surrounding a cutout slug of the tube;

withdrawing the steel rule die from the tube while retaining the slug within the slot;

while squeezing the tube, moving the tube to a discharge position whereat the squeezing of the sides of the tube is discontinued.

2. The method of claim 1 further comprising:

moving the tube a predetermined distance from the slotting position to a second slotting position between the steel rule die and the kissing plate and in such position shifting the steel rule die against and through the sides of the tube forming a second slot therein surrounding a second cutout slug of the tube.

3. The method of claim 1 further comprising:

flattening the tube by substantially engaging the sides, prior to moving the tube to the slotting position.

4. The method of claim 3 wherein shifting the steel rule die includes shifting the steel rule die against and through the sides of the tube while the tube is flattened.

5. The method of claim 1 wherein the tube is moved into the slotting position between a plurality of steel rule dies and the kissing plate.

6. The method of claim 5 wherein the plurality of steel rule dies are configured to be aligned with each other and substantially parallel to the plane along which the tube moves.

7. The method of claim 1 further comprising:

removing the cut-out slug from within the slot of the tube as the tube is moved toward the discharge position; and releasing the tube in the discharge position to allow the tube to be retained.

8. A method of making slotted tubular dunnage for supporting products in a shipping container, the method comprising:

providing a tube including a pair of opposed side walls integrally connected to each other, each side wall having a terminal edge, the terminal edges being bridged together by a bottom wall, the bottom wall having ends, each end extending past one edge to define lateral flanges;

providing a steel rule stamping apparatus having a plurality of steel rule stamping dies horizontally aligned, each die having a face for stamping the tube to make the slotted tubular dunnage, the apparatus having a movable base plate in a home position, each of the clamps having notches formed thereon to receive one of the flanges, the movable base plate having clamps attached thereto, the movable base plate being movable along a substantially parallel plane relative to the face of each die;

sliding each of the flanges within one of the notches to position the tube on the movable base plate in the home position;

clamping the tube to substantially evenly hold the tube on the base plate in the home position, allowing the tube to be movable with the movable base plate;

moving the tube toward the die from the home position to an indexing position at which the tube is to be sensed;

sensing the tube clamped on the base plate in the indexing position;

moving the tube a first predetermined distance toward the die along the substantially parallel plane relative to the face of each die;

flattening the tube by engaging the opposed side walls; and cutting a first set of openings on the tube along the first predetermined distance to form a first set of horizontally aligned slots on the tube and respective cut-out slugs of the slots, defining the slotted tubular dunnage.

9. The method of claim 8 further comprising:

moving the slotted tubular dunnage a set distance from the die toward a discharge position, after cutting the tube;

removing the cut-out slugs from the slots of the dunnage;

unclamping the slotted tubular dunnage from the movable base plate to loosen the slotted tubular dunnage from the movable base plate;

slidably releasing the slotted tubular dunnage from the movable base plate; and returning the movable base plate from the discharge position to the home position.

10. The method of claim 8 further comprising:

moving the slotted tubular dunnage a second predetermined distance after cutting the first set of opening on the tube; and cutting a second set of openings on the tube along the second predetermined distance to form a second set of horizontally aligned slots on the tube and a second set of cut-out slugs.

11. The method of claim 8 wherein the step of cutting includes cutting the opening on the side walls of the tube while the tube is flattened.

* * * * *